United States Patent
Shimizu et al.

[11] Patent Number: 6,067,135
[45] Date of Patent: May 23, 2000

[54] LIQUID CRYSTAL DISPLAY DEVICE AND METHOD OF MANUFACTURING THE SAME

[75] Inventors: Seizaburo Shimizu, Yokohama; Katsuyuki Naito, Tokyo; Hiroki Iwanaga, Yokohama, all of Japan

[73] Assignee: Kabushiki Kaisha Toshiba, Kawasaki, Japan

[21] Appl. No.: 08/774,356

[22] Filed: Dec. 27, 1996

[30] Foreign Application Priority Data

Dec. 27, 1995 [JP] Japan .................................. 7-341837

[51] Int. Cl.⁷ .................................................. G02F 1/1333
[52] U.S. Cl. .................................................. 349/86; 349/89
[58] Field of Search ........................................ 349/86, 89

[56] References Cited

U.S. PATENT DOCUMENTS

| | | | |
|---|---|---|---|
| 4,581,608 | 4/1986 | Aftergut et al. | 340/704 |
| 5,111,316 | 5/1992 | Nobile et al. | 359/52 |
| 5,307,187 | 4/1994 | Sunohara et al. | 359/51 |
| 5,394,256 | 2/1995 | Yamada et al. | 359/51 |
| 5,405,551 | 4/1995 | Reamey et al. | 359/51 |
| 5,410,424 | 4/1995 | Konuma et al. | 359/75 |
| 5,535,027 | 7/1996 | Kimura et al. | 359/58 |
| 5,566,009 | 10/1996 | Yamazake et al. | 359/51 |
| 5,585,947 | 12/1996 | Havens et al. | 349/92 |
| 5,757,448 | 5/1998 | Takei | 349/92 |

FOREIGN PATENT DOCUMENTS

| | | |
|---|---|---|
| 58-501631 | 9/1983 | Japan . |
| 61-502128 | 9/1986 | Japan . |

*Primary Examiner*—William L. Sikes
*Assistant Examiner*—Walter Malinowsk
*Attorney, Agent, or Firm*—Oblon, Spivak, McClelland, Maier & Neustadt, P.C.

[57] ABSTRACT

It is an object of the invention to obtain a liquid crystal display device which has a high light transmittance in a bright portion, can effectively use incident light, and can perform a high-contrast display. This liquid crystal display device includes a substrate having an electrode on a surface, and a light control layer formed on the substrate, wherein the light control layer contains microcapsules containing a liquid crystal material in a transparent film, and adjacent microcapsules adhere closely to each other, or the microcapsules have a polygonal structure. With this arrangement, it is possible to provide a liquid crystal display device which has a high light transmittance in a bright portion, can effectively use incident light, and can perform a high-contrast display.

7 Claims, 7 Drawing Sheets

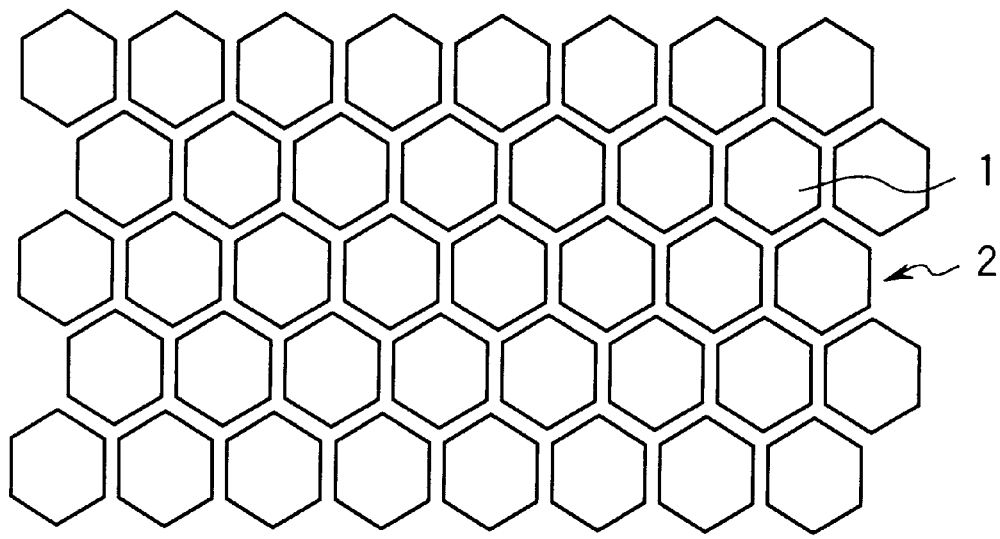
F I G. 1A
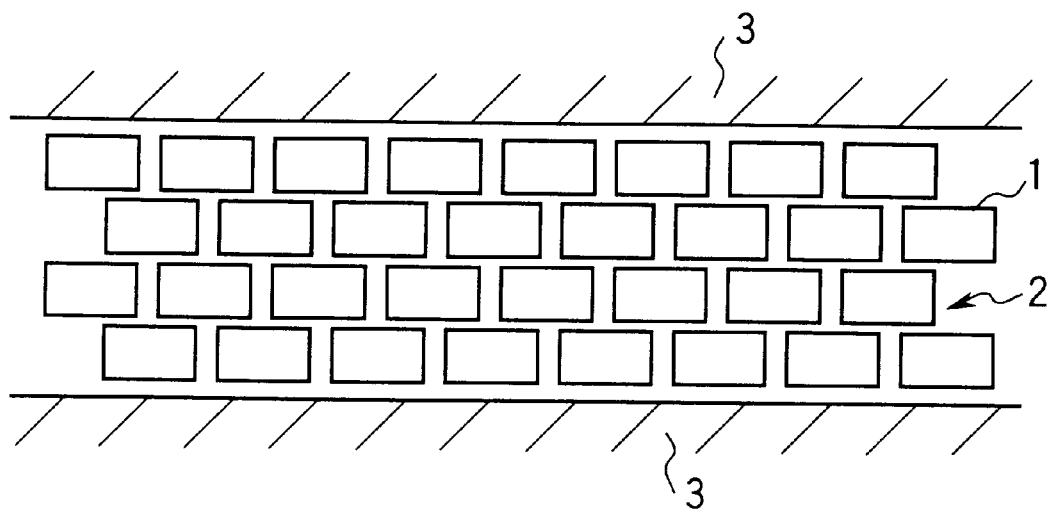
F I G. 1B

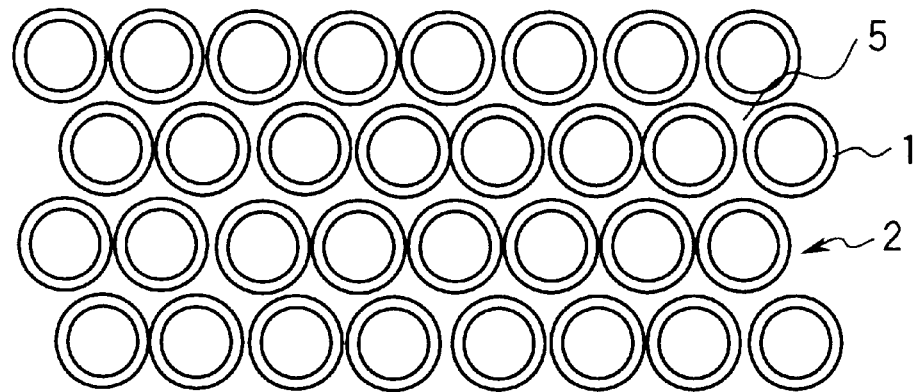
F I G. 2 A
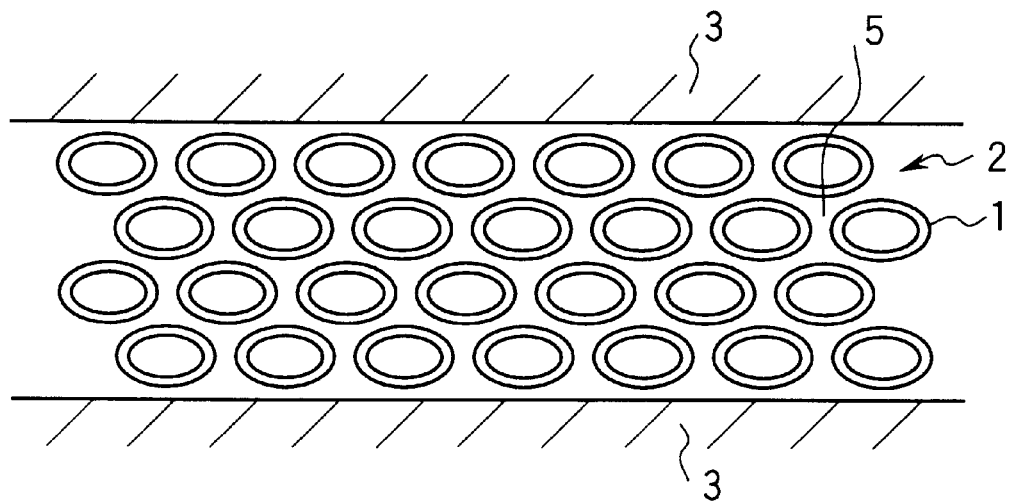
F I G. 2 B

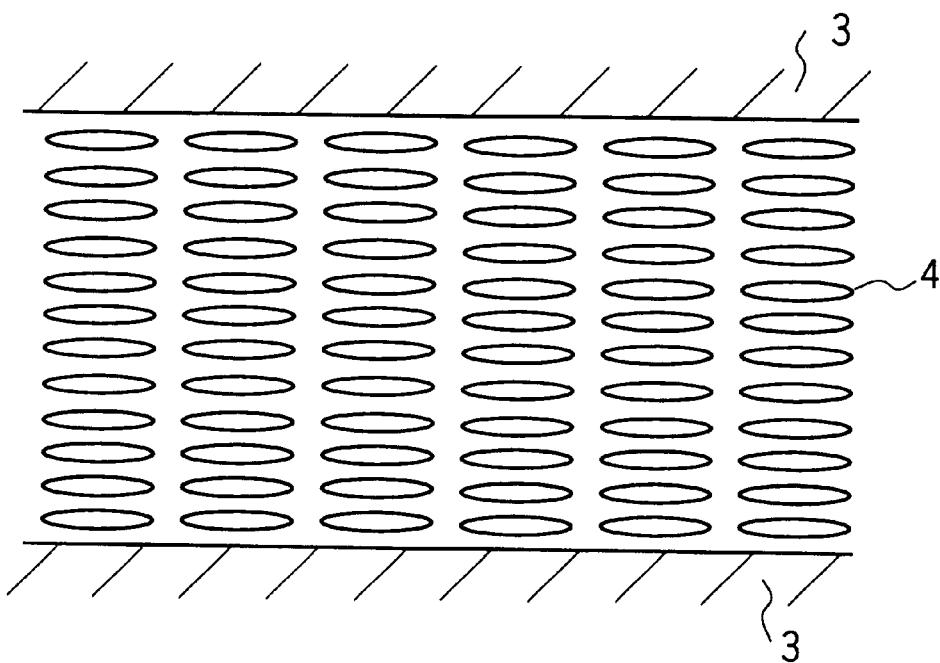
F I G. 3 A
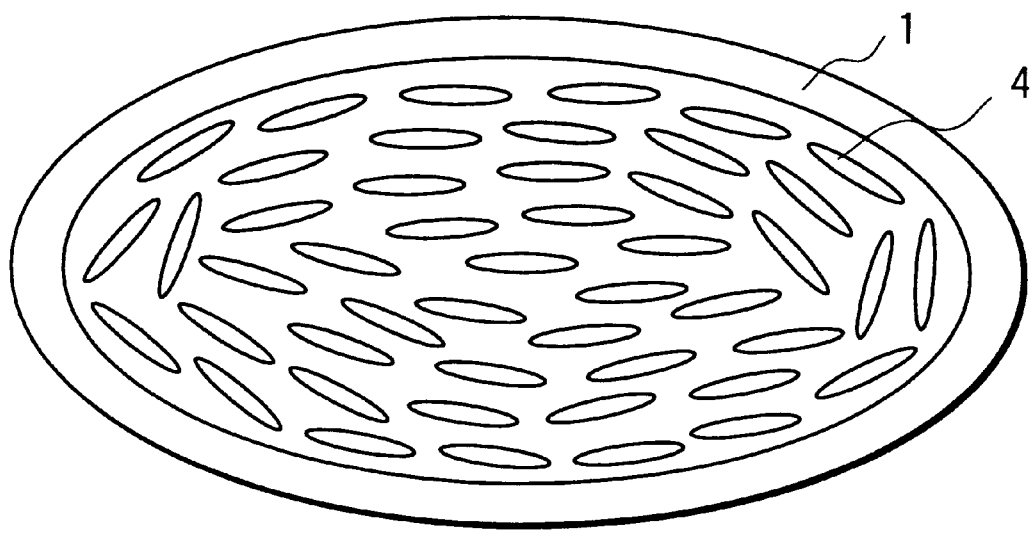
F I G. 3 B

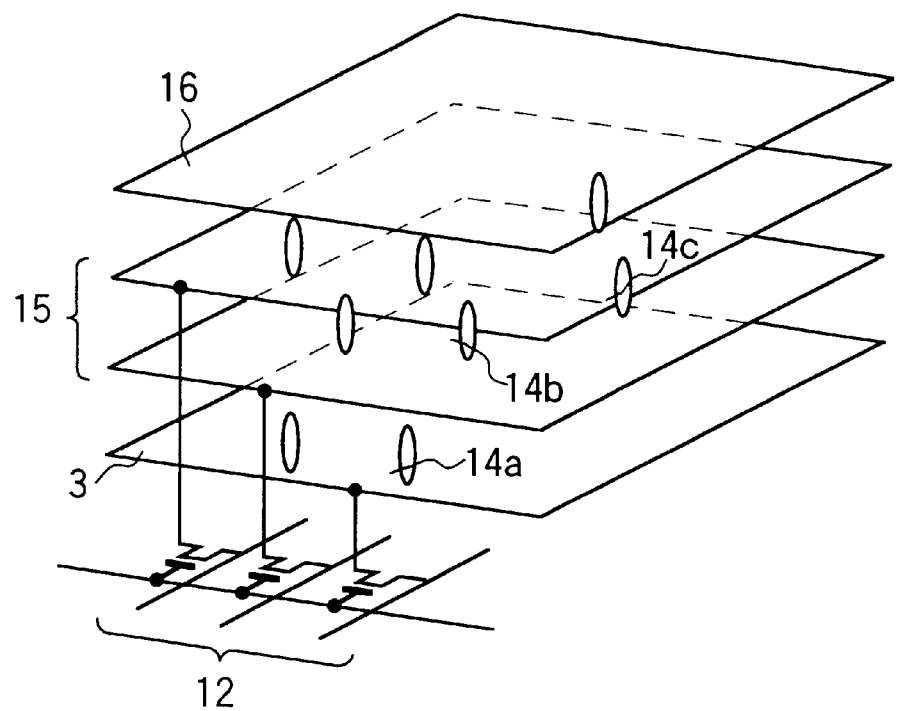
F I G. 8A
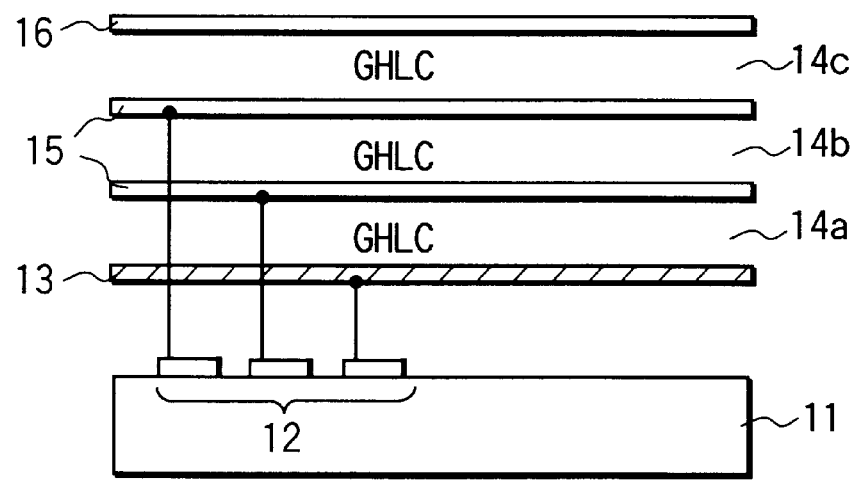
F I G. 8B ( 〇 : MAJOR AXES OF LIQUID CRYSTAL MOLECULES AND DYE MOLECULES ARE PERPENDICULAR TO ELECTRODE SURFACE ✻ : LIQUID CRYSTAL MOLECULES AND DYE MOLECULES ALIGN IN ALL DIRECTIONS )

LIQUID CRYSTAL DISPLAY DEVICE AND METHOD OF MANUFACTURING THE SAME

BACKGROUND OF THE INVENTION

The present invention relates to a liquid crystal display device and a method of manufacturing the same.

Many liquid crystal display devices have been proposed as display devices of information apparatuses. Presently, liquid crystal display devices using a TN (Twisted Nematic) mode liquid crystal disclosed in Jpn. Pat. Appln. KOKAI Publication No. 47-11737 and an STN (Super Twisted Nematic) mode liquid crystal disclosed in Jpn. Pat. Appln. KOKAI Publication No. 60-107020 are extensively used. The TN mode or the STN mode takes an initial state in which the arrangement of liquid crystal molecules is twisted around 90° or 260°, respectively, inside the device. Light entering the device exits with its polarized state being changed by the twisted structure of the liquid crystal molecules and birefringence.

When an electric field is applied to a liquid crystal cell including a liquid crystal layer having the structure of the liquid crystal molecule arrangement as above, the liquid crystal molecules are rearranged in the direction of electrolysis. Consequently, the twisted structure is untwisted and the birefringence is lost. The result is that incident light exits without changing its polarized state. When the liquid crystal cell is sandwiched between two linear polarizers, the optical properties of the liquid crystal layer change on the basis of this principle upon application of a voltage and this change is observed as a change in the intensity of light. Liquid crystal display devices of the TN and STN modes obtain the contrast of brightness in this way.

When compared to CRT (Cathode Ray Tube) displays, liquid crystal display devices using the above display method have the advantages that the consumption power is very small and thin display panels can be realized. Accordingly, liquid crystal display devices of this type are widely used in OA information apparatuses such as personal computers and word processors.

It is, however, difficult to say that liquid crystal display devices using a polarizer effectively use incident light. In effect, many displays ensure brightness by arranging a light source (backlight) behind a liquid crystal display device. Also, in liquid crystal display devices using a color filter, light passing through the device further decreases. As a result, stronger light sources become necessary. The power of a light source is comparable to the consumption power of a liquid crystal display device including a driving circuit. Therefore, liquid crystal display devices with this large consumption power are unsuitable for portable displays which are powered by batteries. That is, not only in liquid crystal color displays but also in black-and-white displays, increasing the brightness and decreasing the consumption power are antinomic in the conventional display systems. Accordingly, the development of a bright display system requiring no backlight is being earnestly desired.

In addition, fluorescent backlights are undesirable because eye fatigue occurs when a user keeps watching the display, and so reflection type bright displays are demanded. Also, when used as a projection display, this bright display system requiring no backlight contributes to miniaturization, a long life, and energy savings of the whole display system with a high light transmittance.

To meet these demands, liquid crystal display devices using no polarizer are proposed and an example is a White-Taylor type guest-host device (J. Appl. Phys. Vol. 45, pp. 4718–4723, 1974). This guest-host device uses a liquid crystal material formed by mixing a dichroic dye in liquid crystal with a chiral nematic phase, and has a structure in which these liquid crystal molecules and dichroic dye molecules are arranged almost parallel to the substrate surface. When an electric field is applied to this guest-host device, the arrangement of the liquid crystal molecules changes to change the direction of the dichroic dye molecules, changing the transmittance of light. Since the liquid crystal molecules take a twisted structure resulting from the chiral nematic phase, light absorption efficiently occurs due to the dye. In this device, therefore, high display contrast can be obtained in principle without using any polarizer.

Unfortunately, to achieve high contrast in this guest-host device, the spiral or helical pitch of the chiral nematic liquid crystal must be set on the order of the wavelength of light. When the helical pitch is shortened to this extent, a large number of declination lines are formed to degrade the display quality. At the same time, a hysteresis phenomenon occurs and this extremely lowers the speed of response to an electric field. Accordingly, the quest-host device is impractical compared to the TN mode and the STN mode.

Another example of the display systems using no polarizer is a display system called PDLC (Polymer Dispersed Liquid Crystal) disclosed in Jpn. Pat. Appln. KOKAI Publication No. 58-501631. This display system uses a material prepared by dispersing a nematic liquid crystal having positive dielectric anisotropy, in the form of grains with a diameter of several $\mu$m, in a polymer matrix. Also, this PDLC uses a liquid crystal material whose refractive index to ordinary light is nearly the same as the refractive index of the polymer matrix and refractive index to extraordinary light is different from the refractive index of the polymer matrix.

In this display system in its initial state, liquid crystal molecules are twisted in the liquid crystal grains and the difference in refractive index is produced between most liquid crystal grains and the polymer matrix due to variations in the direction of arrangement of the liquid crystal grains. As a consequence, the device scatters light like frosted glass. When a sufficient voltage is applied to the device, the liquid crystal molecules in the liquid crystal grains are rearranged to make the refractive indices of the liquid crystal and the polymer matrix equal to each other with respect to vertical incident light. This eliminates refraction and reflection in the interface between the liquid crystal and the polymer matrix and thereby makes the device transparent. Note that the incident light need not be linear light.

Since the PDLC displays images by using the principle of operation as above, no polarizer is necessary and incident light can be effectively used, resulting in a bright display. However, a few tens of $\mu$m are required as the thickness of the device to achieve a satisfactory display contrast, and consequently the driving voltage becomes several tens of V. Additionally, since the device is of scattering type, the device is effective as a projection display but inadequate as a direct-view display of, e.g., an OA apparatus.

Reflection displays in which the arrangement of a reflector or a liquid crystal material is improved by mixing a dichroic dye in nematic liquid crystal are proposed in Jpn. Pat. Appln. KOKAI Publication Nos. 59-178429 and 59-178428. Unfortunately, even these devices do not satisfactorily meet the demands for direct-view displays of OA apparatuses and the like.

BRIEF SUMMARY OF THE INVENTION

The present invention has been made in consideration of the above situation and has as its object to provide a liquid crystal display device suitable for a direct-view information display of an OA apparatus. That is, it is an object of the present invention to provide a liquid crystal display device which has a high light transmittance in a bright portion, can effectively use incident light, and can perform a high-contrast display.

The present invention provides a liquid crystal display device comprising a substrate having an electrode on a surface and a light control layer formed on the substrate, wherein the light control layer contains microcapsules containing a liquid crystal material in a transparent film, and adjacent microcapsules adhere closely to each other.

Also, the present invention provides a liquid crystal display device comprising a substrate having an electrode on a surface and a light control layer formed on the substrate, wherein the light control layer contains microcapsules containing a liquid crystal material in a transparent film, and the microcapsules have a polygonal structure.

In the present invention, it is preferable that liquid crystal molecules of the liquid crystal material be arranged almost parallel to the substrate surface, that the liquid crystal molecules be arranged almost parallel to the substrate surface, a plurality of layers of microcapsules be stacked, and many liquid crystal molecules in the same layer be arranged in the same direction, or that the liquid crystal molecules be arranged almost perpendicularly to the substrate surface. The liquid crystal material preferably contains a dichroic dye. In the present invention, it is also preferable that liquid crystal molecules in each microcapsule be oriented in different directions, and that the transparent film forming the microcapsule be made from at least two types of materials.

Furthermore, the present invention provides a method of manufacturing a liquid crystal display device, comprising the steps of forming a light control layer including microcapsules containing a liquid crystal material in a transparent film on a substrate having an electrode on a surface, and fusing the microcapsules to each other.

In the present invention, it is preferable that the step of fusing the microcapsules to each other be performed after a dispersion consisting of the microcapsules and a dispersion medium is applied on the substrate and while the dispersion medium is evaporated, while the evaporation of the dispersion medium is shifted (the evaporation time is changed) on the substrate, while a pressure is applied to the microcapsules in a direction nearly perpendicular to the substrate surface, or while a shearing stress is applied to the microcapsules in a direction nearly parallel to the substrate surface. The method of the present invention preferably further comprises the step of hardening the transparent film forming the microcapsule after the step of fusing the microcapsules to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a schematic plan view showing one example of a liquid crystal microcapsule layer of a liquid crystal display device according to the present invention;

FIG. 1B is a schematic sectional view showing the liquid crystal microcapsule layer shown in FIG. 1A;

FIG. 2A is a schematic plan view showing an example of a conventional liquid crystal microcapsule layer;

FIG. 2B is a schematic sectional view showing the liquid crystal microcapsule layer shown in FIG. 2A;

FIG. 3A is a schematic view showing the orientation of liquid crystal molecules in a liquid crystal microcapsule of a liquid crystal display device according to the present invention;

FIG. 3B is a schematic view showing the orientation of liquid crystal molecules in a liquid crystal microcapsule having a curved interface;

FIG. 8A is a schematic view showing a liquid crystal display device according to Example 11 of the present invention;

FIG. 8B is a sectional view showing the liquid crystal display device shown in FIG. 8A;

DETAILED DESCRIPTION OF THE INVENTION

Figure 4A:
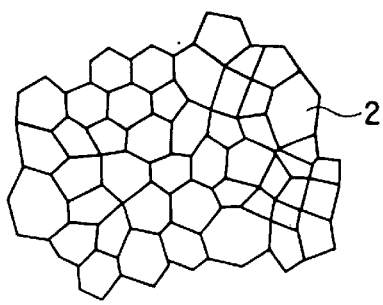
FIG. 4A is a schematic plan view showing a liquid crystal microcapsule layer in Example 1 of the liquid crystal display device of the present invention.

A liquid crystal display device of the present invention is characterized in that a light control layer formed on a substrate having an electrode includes microcapsules containing a liquid crystal material in a transparent film, and that adjacent microcapsules adhere closely to each other. A liquid crystal display device may have a structure of including a pair of substrates each having an electrode, and a light control layer sandwiched between a pair of substrates. Another characteristic feature of the liquid crystal display is that the microcapsule has a polygonal structure. That is, as shown in FIG. 1A, the liquid crystal display device of the present invention comprises a light control layer having a structure in which liquid crystal microcapsules 2, in each of which a liquid crystal material is contained in a transparent film 1, are so arranged as to adhere closely to each other. In addition, this microcapsule has a polygonal structure (a hexagonal structure in FIG. 1A).

With this structure, the liquid crystal microcapsules 2 can be aggregated very densely and the voltage control region for light can be increased per unit area. Also, the amount of the polymer material forming the transparent film can be extremely decreased.

Furthermore, by using a planar structure in which the liquid crystal microcapsules are arranged nearly parallel to the substrate as shown in FIG. 1B, liquid crystal molecules 4 can be oriented almost parallel to the surface of a substrate 3 as shown in FIG. 3A. Since this extremely increases the difference between the refractive index when a voltage is applied and the refractive index when no voltage is applied, it is possible to enhance the light scattering and increase the contrast.

As shown in FIGS. 2A and 2B, common liquid crystal microcapsules having curved interfaces have gaps 5 between them. Therefore, a considerable amount of the polymer material forming the transparent film exists between these liquid crystal microcapsules. This is disadvantageous in that the light scattering is weakened and the contrast is decreased. In a so-called polymer-liquid crystal composite structure, the amount of a polymer material can be extraordinarily decreased. However, the initial orientation of liquid crystal molecules is random and it is very difficult to orient the molecules in the same direction.

Generally, in a material called a polymer dispersed liquid crystal or a polymer-liquid crystal composite body having a curved polymer-liquid crystal interface, liquid crystal molecules are oriented along the curved surface. Therefore, unlike in a common TN cell or STN cell, the difference between the ordinary light refractive index and the extraordinary light refractive index of the liquid crystal cannot be increased. That is, an ordinary light refractive index is obtained when nematic liquid crystal molecules with positive dielectric anisotropy are raised by application of a voltage. However, in a material having a curved polymer-liquid crystal interface, as shown in FIG. 3B, liquid crystal molecules are oriented along the interface when no voltage is applied. This results in a refractive index intermediate between the ordinary light refractive index and the extraordinary light refractive index. Consequently, the contrast is decreased and light leakage occurs.

When a planar structure (including a stacked structure) in which liquid crystal microcapsules are arranged almost parallel to the substrate as shown in FIG. 1B, the liquid crystal molecules can be oriented nearly perpendicularly to the substrate surface by introducing, e.g., a long-chain alkyl group into the material which forms the transparent film in contact with the liquid crystal molecules. It is also possible to perform a colorless positive display when there is no voltage applied, by using a liquid crystal substance with negative dielectric anisotropy as a liquid crystal material and orienting the liquid crystal molecules almost perpendicularly to the substrate surface as described above.

If the cell gap between liquid crystal display device is excessively large, the driving voltage becomes high, whereas if the cell gap is excessively small, the contrast becomes low. In order to maintain a low driving voltage and a high contrast, the present invention provides a preferable range of the cell gap, that is, 5 $\mu$m to 10 $\mu$m.

If the diameter of the liquid crystal microcapsule is excessively small, the scattering of light becomes strong, deteriorating the display characteristics. If the diameter of the microcapsule is excessively large, the mechanical strength of the microcapsule itself is lowered, which is not desirable. In order to maintain a low light scattering and a high mechanical strength, the present invention provides a preferable range of the diameter of the liquid crystal microcapsule, that is, 2 $\mu$m to 10 $\mu$m.

If the wall of a liquid crystal microcapsule is excessively thick, the ratio of the liquid crystal or dye becomes low, thus lowering the contrast. If the wall of the microcapsule is excessively thin, the mechanical strength becomes low. In order to maintain a high contrast and a high mechanical strength, the present invention provides a preferable range of the thickness of the wall of the liquid crystal microcapsule, that is, 2% to 20% of the radius of the microcapsule. It is more preferable that the thickness should be 5% to 20% of the radius of the microcapsule.

The present invention is particularly effective in a guest-host liquid crystal display device using a liquid crystal material containing a dichroic dye. That is, a dichroic dye generally does not easily dissolve in a liquid crystal material. In particular, a dichroic dye does not easily dissolve in a fluorine-based liquid crystal material with excellent voltage holding characteristics. Since a dichroic dye dissolves in a polymer material, it is possible to extremely decrease the amount of the polymer material forming the transparent film and relatively increase the amount of the dichroic dye in the liquid crystal material. Accordingly, the structure of the liquid crystal display device of the present invention is very effective.

Also, a dichroic dye can absorb light with respect only to the molecular axis. By arranging a dichroic dye nearly parallel to the substrate, the light absorption amount can be maximized. In the liquid crystal display device of the present invention, liquid crystal molecules can be arranged almost parallel to the substrate surface as described above. Therefore, a dichroic dye can also be arranged almost parallel to the substrate in accordance with the orientation of the liquid crystal molecules, so the light absorption amount can be maximized.

In the liquid crystal display device of the present invention, it is possible to stack a plurality of layers of liquid crystal microcapsules containing a liquid crystal material in a transparent film and orient the liquid crystal molecules in different directions in vertically contacting liquid crystal microcapsules. With this structure, the light scattering can be enhanced and, especially when a dichroic dye is contained in the liquid crystal material, light rays having different polarized light components can be absorbed. Consequently, a high contrast can be obtained without using any polarizing plate, and this makes the device suitable for a reflection display.

In the liquid crystal display device of the present invention, the transparent film can be made from two or more types of transparent polymer materials. To lower the driving voltage of the liquid crystal material, it is necessary that the interaction between the polymer material which forms the transparent film in contact with the liquid crystal material and the liquid crystal material be not so large. On the other hand, the transparent film is required to have various characteristics, e.g., a high heat resistance, a high solvent resistance, and a high refractive index. It is generally difficult for a transparent film made from a single polymer material to satisfy all these characteristics. As described above, these problems can be solved by forming the transparent film by using two or more types of transparent polymer materials.

In the liquid crystal display device of the present invention, the thickness of the transparent film is preferably 30% or less of the thickness in the vertical direction of the liquid crystal material region contained in the transparent film. The thickness of the transparent film is preferably as small as possible. A thickness which is 30% or less of the thickness in the vertical direction of the liquid crystal material region contained in the transparent film is allowable in respect of the display performance. In contrast, too small a thickness is unpreferable because the mechanical and heat resistances are decreased. Therefore, the thickness of the transparent film is preferably 5% to 15% of the thickness in the vertical direction of the liquid crystal material region contained in the film.

In the light control layer of the liquid crystal display device of the present invention, the liquid crystal microcapsules can be formed by a single layer or a plurality of layers. When a single-layer structure is used, however, the fusing conditions of the liquid crystal microcapsules are severe and there is the possibility that the liquid crystal microcapsules are damaged. Therefore, a stacked structure consisting of a plurality of layers is preferable.

In the liquid crystal display device of the present invention, a thin polymer layer can be formed between the light control layer containing the microcapsules and the electrode. This polymer layer planarizes the light control layer and can also be used as a protective film, a moisture-resistant layer, or an ultraviolet-resistant layer in the formation of the electrode.

A method of manufacturing the liquid crystal display device of the present invention is characterized in that a light control layer consisting of microcapsules containing a liquid crystal material in a transparent film is formed on at least one of a pair of substrates each having an electrode on the surface, the microcapsules are fused to each other, and the light control layer is sandwiched between the substrates.

By fusing the liquid crystal microcapsules to each other as described above, the transparent film of each liquid crystal microcapsule is drawn to bury the gap between the liquid crystal microcapsules. Also, the transparent film extends to maintain the volume of the internal liquid crystal material. Consequently, the transparent film is stretched parallel to (in the plane of) the substrate surface. In this manner the liquid crystal microcapsules form a layered stacked structure. In this structure, the internal liquid crystal molecules are oriented in the stretching direction of the transparent film (in the direction parallel to the substrate surface). Consequently, the liquid crystal molecules in the layered stacked liquid crystal microcapsules are oriented in the stretching direction.

The fusion of the liquid crystal microcapsules automatically occurs when a microcapsule dispersion is applied on the substrate and the dispersion medium is evaporated, due to the autohesion of the polymer components forming the walls of the capsules. By changing the evaporation time of the dispersion medium on the substrate, the fusing direction (stretching direction) of the microcapsules can be defined in one direction. An example of this method is a dipping method by which the substrate is slowly pulled up from a microcapsule dispersion. Accordingly, by performing dipping a plurality of number of times while the pulling direction of the substrate is changed, the axial direction of the parallel oriented liquid crystal molecules can be changed from one microcapsule layer to another. This is suited to a guest-host liquid crystal display device using no polarizing plate.

In fusing the liquid crystal microcapsules, the action of stretching can be further increased by applying a pressure in a direction (of the cell thickness) perpendicular to the substrate surface. This also increases the area of the transparent film surface in a direction parallel to the substrate surface. Furthermore, when the liquid crystal microcapsules are fused while a shearing stress is applied parallel to the substrate, the transparent film can be stretched in the direction of the stress. Consequently, the liquid crystal molecules in the liquid crystal microcapsule are also oriented in the stretching direction.

Additionally, when the transparent film is hardened by a heat treatment or a hardening treatment using a reagent after the liquid crystal microcapsules are fused, the structure of the light control layer after the fusion can be held more stably.

In the method of the present invention, when the transparent film of each liquid crystal molecule has a two-layer structure consisting of an inner layer made from a material having a certain softening temperature and an outer layer made from a material having a softening temperature lower than that of the material of the inner layer, only the outer layers of the films soften and fuse to each other when the microcapsules are fused at the softening temperature of the material of the outer layer. If this is the case, since the liquid crystal microcapsules having a polygonal structure are fused, the area of each transparent film tends to increase if the internal volume is held constant. Consequently, the inner layer is stretched without being fused. In this way the liquid crystal microcapsules can be fused at a lower temperature by using a multilayer structure (two-layer structure) as the transparent film.

As a method of forming the liquid crystal microcapsules containing the liquid crystal material in the transparent film, it is possible to use microcapsulation methods such as a phase separation method, a submerged drying method, an interface polymerization method, an in-situ polymerization method, a submerged hardening film method, and a spray drying method.

As the polymer material forming the transparent film, it is possible to use almost all polymer materials, e.g., polyethylenes; ethylene copolymers such as chlorinated polyethylenes, an ethylene-vinyl acetate copolymer, and an ethyleneyacrylic acidymaleic anhydride copolymer; polybutadienes; polyesters such as polyethyleneterephthalate, polybutyleneterephthalate, and polyethylenenaphthalate; polypropylenes; polyisobutylenes; polyvinyl chlorides; natural rubbers; polyvinylidene chlorides; polyvinyl acetates; polyvinyl alcohols; polyvinyl acetals; polyvinyl butyrals; fluorine resins such as an ethylene tetrafluoride resin, an ethylene trifluoride resin, an ethylene fluorideypropylene resin, a vinylidene fluoride resin, a vinyl fluoride resin, ethylene tetrafluoride copolymers, e.g., an ethylene tetrafluoride-perfluoroalkoxyethylene copolymer, an ethylene tetrafluoride-perfluoroalkylvinylether copolymer, an ethylene tetrafluoride-propylene hexafluoride copolymer, and an ethylene tetrafluoride-ethylene copolymer, and fluorine-containing polybenzoxazole; acrylic resins; methacrylic resins; acrylonitrile copolymers such as polyacrylonitrile and an acrylonitrile-butadiene-styrene copolymer; polystyrene; a styrene-acrylonitrile copolymer; an acetal resin; polyamides such as Nylon 66; polycarbonates; polyestercarbonates; cellulose resins; phenolic resins; urea resins; epoxy resins; unsaturated polyester resins; alkyd resins; melamine resins; polyurethanes; diarylphthalates; polyphenyleneoxides; polyphenylenesulfides; polysulfones; polyphenylsulfones; silicone resins; polyimides; bismaleimidotriazine resins; polyimidoamides; polyetherimides; polyvinylcarbazoles; norbornene-based amorphous polyolefin; and celluloses.

If the glass transition temperature is excessively low, the microcapsule becomes instable near room temperature, deteriorating the display characteristics. If the glass transition temperature is excessively high, the temperature required for fusing capsules becomes high, and therefore liquid crystal molecules or dye molecules within a capsule are denatured or sublimated, which is not desirable. In order to maintain the microcapsules sufficiently stable near room temperature and avoid adverse influences on the liquid crystal molecules or dye molecules during the manufacture of the capsules, the present invention provides a preferable range of the glass transition temperature, that is, 60° C. to 170° C.

Any liquid crystal material can be used in the present invention as long as the material has refractive index anisotropy and changes its orientation order upon application of a voltage. Preferable examples are nematic and cholesteric liquid crystals. To cause a transparency-opacity change by switching the light scattering/transparency with a voltage, the liquid crystal material must be so selected that the refractive index of the transparent film equals the refractive index when the liquid crystal material is transparent (ON).

More specifically, examples of the liquid crystal material usable in the present invention are fluorine-based liquid crystals, cyano-based liquid crystals, and ester-based liquid crystals. For example, it is possible to use various liquid crystal compounds represented by formulas (1) to (10) below and their mixed compositions.

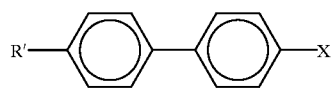

(1)

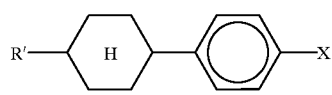

(2)

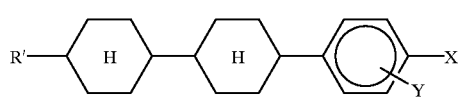

(3)

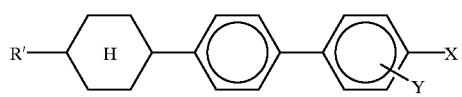

(4)

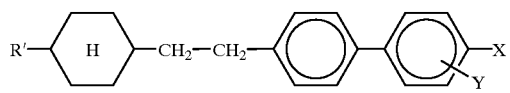

(5)

-continued

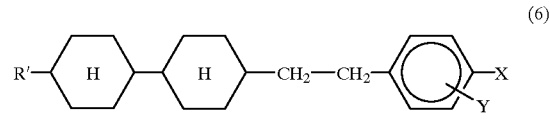

(6)

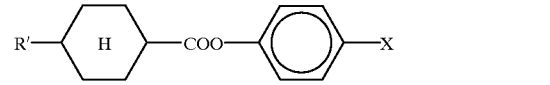

(7)

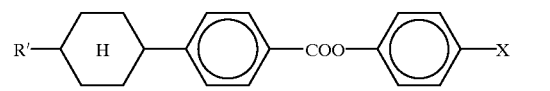

(8)

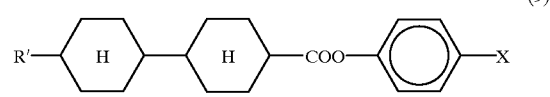

(9)

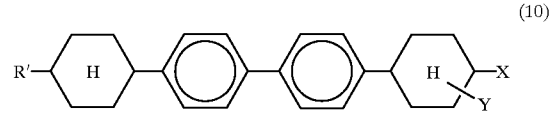

(10)

(wherein R' and X independently represent an alkyl group, an alkoxy group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyalkylphenylalkyl group, an alkoxyalkylcyclohexylalkyl group, an alkylcyclohexylalkyl group, an alkoxyalkoxycyclohexylalkyl group, an alkoxyphenylalkyl group, or an alkylcyclohexylphenylalkyl group, and Y represents a hydrogen atom or a halogen atom. These alkyl and alkoxy chains may contain an optically active center. Also, a phenyl group or a phenoxy group in R' and X may be substituted by a halogen atom such as a fluorine atom or a chlorine atom. Furthermore, a phenyl group in each formula may be substituted by one or two halogen atoms such as fluorine atoms or chlorine atoms.)

All liquid crystal compounds represented by these formulas have positive dielectric anisotropy. However, it is also possible to mix a known liquid crystal compound with negative dielectric anisotropy in a liquid crystal compound with positive dielectric anisotropy and use the mixture as a liquid crystal compound having positive dielectric anisotropy as a whole. Also, a liquid crystal compound with negative dielectric anisotropy can be directly used when an appropriate device construction and a proper driving method are used.

In the liquid crystal display device of the present invention, a dichroic dye can be used as one constituent element of the liquid crystal material in order to improve the contrast and produce colors. As this dichroic dye, it is necessary to use a dye which is miscible in the liquid crystal compound and is not easily dissolved in or adsorbed by the polymer material forming the transparent film. To add the dichroic dye, it is necessary to select the polymer material forming the transparent film and the liquid crystal material by taking account of the refractive index meeting the purpose. That is, to increase the contrast by using light scattering, it is desirable to choose a liquid crystal material with a large refractive index anisotropy. This, however, brings about the drawback that the color of reflected light is whitened. On the other hand, if the refractive index anisotropy is small and close to the refractive index of a monomer compound, the original color of the dichroic dye can be obtained. As dichroic dye molecules, it is possible to use, e.g., yellow dyes represented by formulas (11) to (19), magenta dyes represented by formulas (20) to (27), and cyan dyes represented by formulas (28) to (31).
(11)
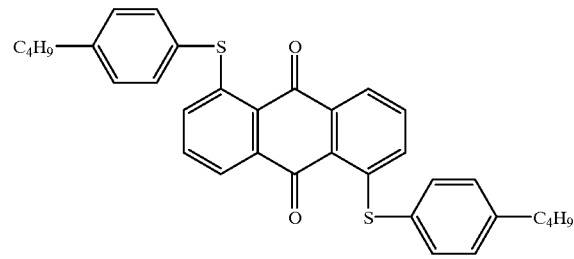
(12)
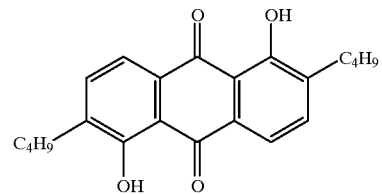
(13)
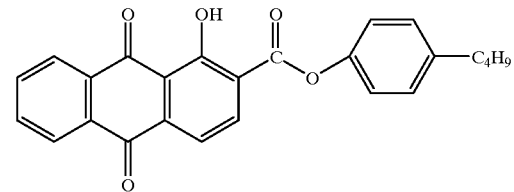
(14)
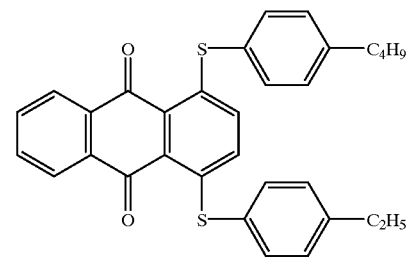
(15)
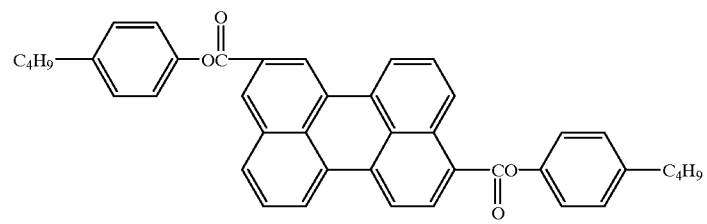
(16)
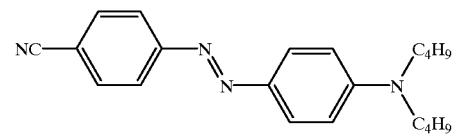

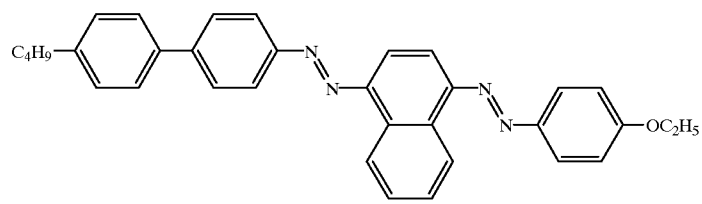
(17)
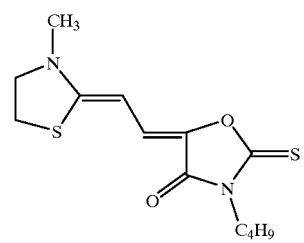
(18)
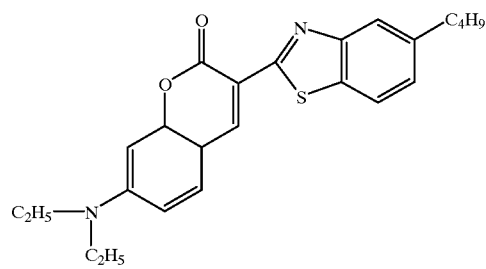
(19)
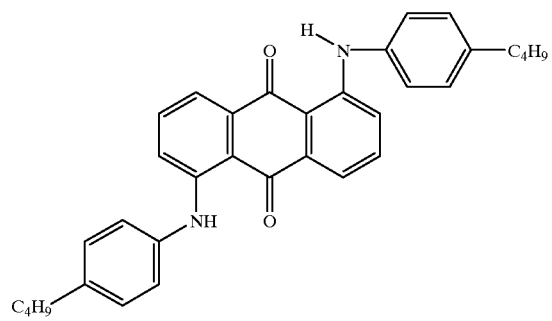
(20)
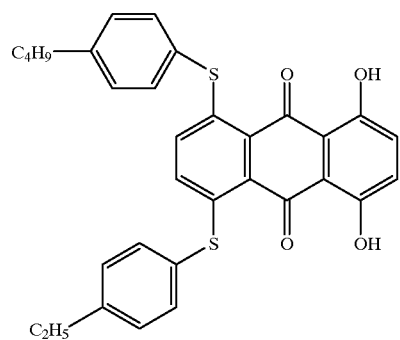
(21)

-continued
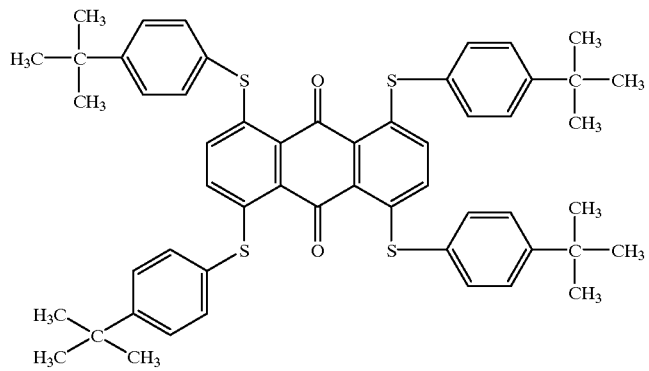
(22)
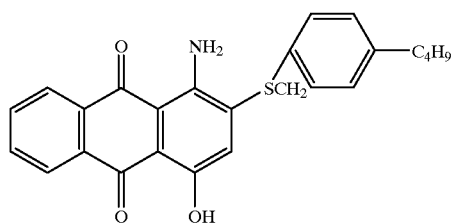
(23)
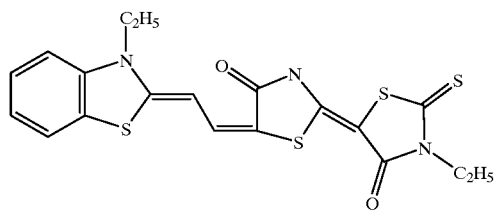
(24)
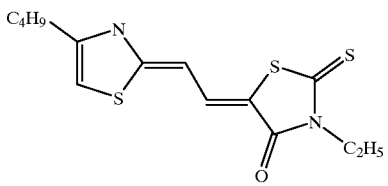
(25)
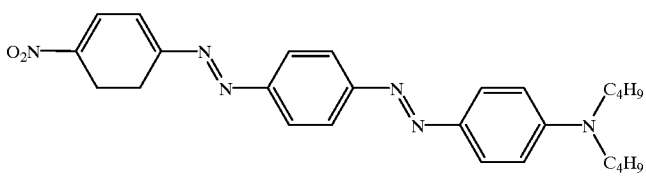
(26)
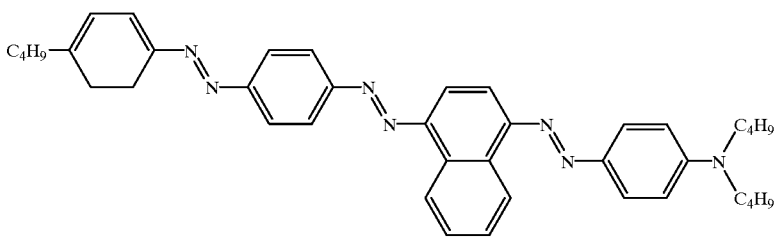
(27)

(28)

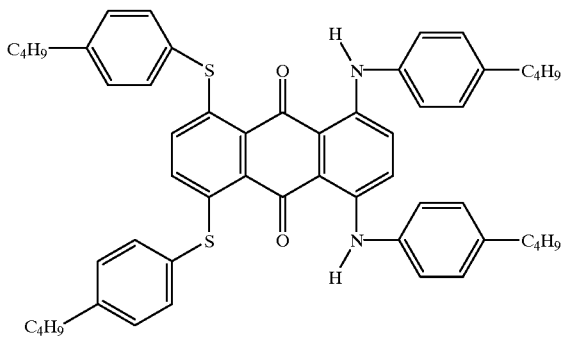

(29)

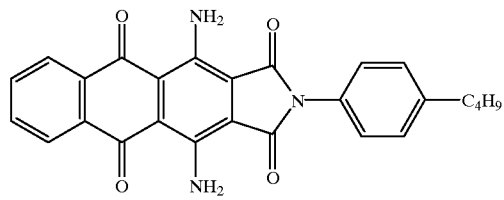

(30)

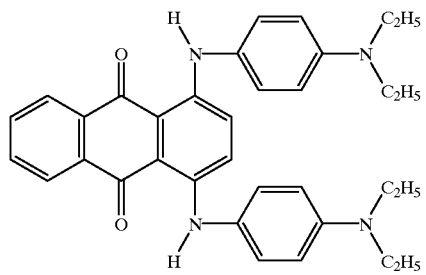

(31)

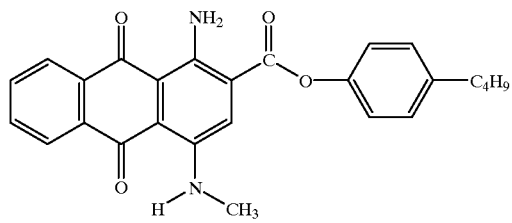

In the liquid crystal display device of the present invention, a fluorescent dye can also be used as one constituent element of the liquid crystal material in order to brighten the reflected light or as an ultraviolet absorbent. If this is the case, it is preferable that the fluorescent dye dissolve in the transparent film and do not easily dissolve in the liquid crystal material.

When the dichroic dye is used in the present invention, the weight ratio of the dye to the liquid crystal material is 0.01 to 10%, preferably 0.1 to 5%. If the weight ratio is too low, the contrast cannot be well improved. If the weight ratio is too high, coloring remains even when a voltage is applied and this lowers the contrast.

In the liquid crystal display device of the present invention, at least one of the two substrates must be a transparent substrate. As this transparent substrate, it is possible to use, e.g., a glass substrate, a transparent plastic substrate, or a transparent plastic film. As a substrate which is not transparent, it is possible to use an opaque substrate or a semitransparent substrate such as a substrate having an aluminum reflecting electrode.

Examples performed to clarify the effect of the present invention will be described below.

EXAMPLE 1

80 parts by weight of nematic liquid crystal ZLI-1840 (available from Merck Corp.) having positive dielectric anisotropy, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a nonionic surfactant Emergen 120 (available from Kao Corp.), and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 2 to 4 μm were obtained.

10 wt % of the resultant liquid crystal microcapsules were dispersed in a 10% aqueous isopropyl alcohol solution. The dispersion was applied by using an applicator on the surface of a glass substrate on which a transparent electrode was previously formed, and was dried to form a liquid crystal microcapsule layer (light control layer). In addition, a polymer film on which a transparent electrode was previously formed was laminated on the liquid crystal microcapsule layer. In this way a liquid crystal display device of the present invention was manufactured.

Figure 4B:
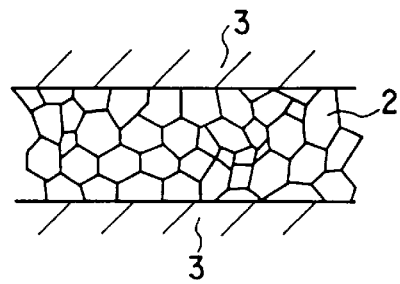
FIG. 4B is a schematic sectional view showing the liquid crystal microcapsule layer shown in FIG. 4A.

The obtained liquid crystal display device was observed with a microscope. The result is shown in FIGS. 4A and 4B. FIG. 4A is a schematic view of the structure viewed in a direction perpendicular to the substrate surface. FIG. 4B is a schematic view of the structure viewed in a direction parallel to the substrate surface. As can be seen from FIGS. 4A and 4B, the liquid crystal microcapsules fused to each other and had a polygonal structure in which the fused portions were straight. The orientation of the liquid crystal molecules was nearly parallel to the substrate surface, and the axial directions of the orientation were fixed in the same direction (uniaxial orientation) in the microcapsules but were random between the microcapsules. The thickness of the liquid crystal microcapsule layer (light control layer) was 10 μm. This liquid crystal display device was white-opaque and became transparent when applied with an AC voltage of 10 V at 50 Hz. The contrast ratio calculated from the transmission absorbance was 22.

Comparative Example 1

80 parts by weight of nematic liquid crystal ZLI-1840 having positive dielectric anisotropy and 15 parts by weight of polymethylmethacrylate were dissolved in chloroform. The resultant solution was applied on the surface of a glass substrate on which a transparent electrode was previously formed, and was dried to form a liquid crystal layer (light control layer). Subsequently, a polymer film on which a transparent electrode was previously formed was laminated on the liquid crystal layer. In this manner a liquid crystal display device of a comparative example was manufactured.

Figure 5A:
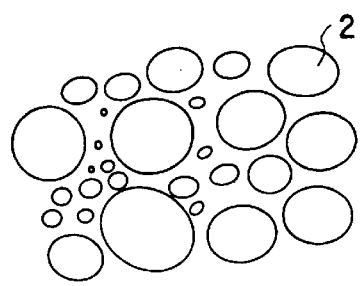
FIG. 5A is a schematic plan view showing a liquid crystal layer in Comparative Example 1.
Figure 5B:
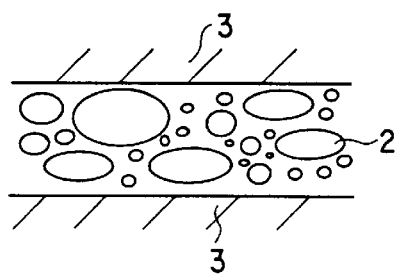
FIG. 5B is a schematic sectional view showing the liquid crystal layer shown in FIG. 5A.

The obtained liquid crystal display device was observed with a microscope. The result is shown in FIGS. 5A and 5B. FIG. 5A is a schematic view of the structure viewed in a direction perpendicular to the substrate surface. FIG. 5B is a schematic view of the structure viewed in a direction parallel to the substrate surface. As can be seen from FIGS. 5A and 5B, the liquid crystal domains had various sizes and curved interfaces. The thickness of the liquid crystal layer (light control layer) was 10 μm. This liquid crystal display device was white-opaque and became transparent when applied with an AC voltage of 12 V at 50 Hz. The contrast ratio calculated from the transmission absorbance was 14.

Comparative Example 2

80 parts by weight of nematic liquid crystal ZLI-1840 having positive dielectric anisotropy, 15 parts by weight of a methylmethacrylate monomer, and 1 part by weight of divinylbenzene as a crosslinking agent were mixed and dissolved. The resultant solution was poured into a liquid crystal cell previously assembled with a cell gap of 10 μm. Subsequently, ultraviolet rays having a wavelength of 254 nm were irradiated on the liquid crystal cell to harden the liquid crystal composition.

Figure 6A:
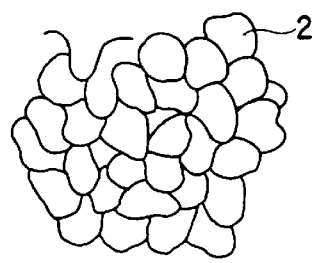
FIG. 6A is a schematic plan view showing a liquid crystal layer in Comparative Example 2.
Figure 6B:
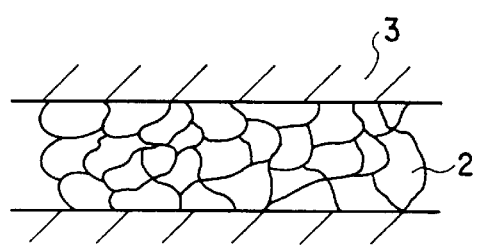
FIG. 6B is a schematic sectional view showing the liquid crystal layer shown in FIG. 6A.

The obtained liquid crystal display device was observed with a microscope. The result is shown in FIGS. 6A and 6B. FIG. 6A is a schematic view of the structure viewed in a direction perpendicular to the substrate surface. FIG. 6B is a schematic view of the structure viewed in a direction parallel to the substrate surface. As is apparent from FIGS. 6A and 6B, the liquid crystal domains formed a network structure. Also, the liquid crystal molecules were randomly oriented. This liquid crystal display device was white-opaque and became transparent when applied with an AC voltage of 11 V at 50 Hz. The contrast ratio calculated from the transmission absorbance was 17.

EXAMPLE 2

80 parts by weight of nematic liquid crystal ZLI-1840 having positive dielectric anisotropy, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a nonionic surfactant Emergen 120, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 4 to 6 μm were obtained.

10 wt % of the resultant liquid crystal microcapsules were dispersed in a 10% aqueous isopropyl alcohol solution. The dispersion was applied by using an applicator on the surface of a glass substrate on which a transparent electrode was previously formed, and was dried to form a liquid crystal microcapsule layer (light control layer). In addition, a glass substrate on which a transparent electrode was previously formed was stacked on the liquid crystal microcapsule layer. The resultant structure was placed in a polyamide bag, the bag was evacuated, and in this state a heat treatment at 120° C. was performed to thermally adhere the glass substrates. In this way a liquid crystal display device of the present invention was manufactured.

Figure 7A:
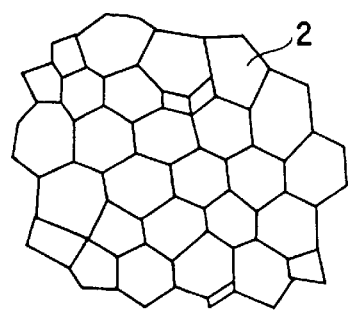
FIG. 7A is a schematic plan view showing a liquid crystal microcapsule layer in Example 2 of the liquid crystal display device of the present invention.
Figure 7B:
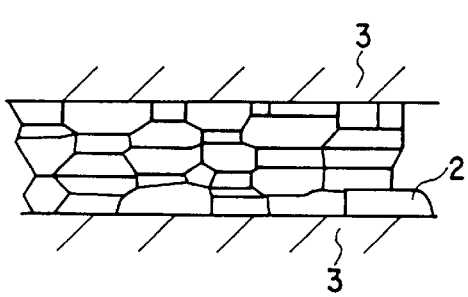
FIG. 7B is a schematic sectional view showing the liquid crystal microcapsule layer shown in FIG. 7A.

The obtained liquid crystal display device was observed with a microscope. The result is shown in FIGS. 7A and 7B. FIG. 7A is a schematic view of the structure viewed in a direction perpendicular to the substrate surface. FIG. 7B is a schematic view of the structure viewed in a direction parallel to the substrate surface. As can be seen from FIGS. 7A and 7B, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The orientation of the liquid crystal molecules was nearly parallel to the substrate surface, and the order parameter of the orientation was higher than that in Example 1. The thickness of the liquid crystal microcapsule layer (light control layer) was 8 μm. This liquid crystal display device was white-opaque and became transparent when applied with an AC voltage of 9.5 V at 50 Hz. The contrast ratio calculated from the transmission absorbance was 25.

EXAMPLE 3

80 parts by weight of a material prepared by dissolving 1 wt % of black dichroic dye S-435 (tradename; available from Mitsui Toatsu Chemicals, Inc.) in liquid crystal ZLI-1695 (available from Merck Corp.), 15 parts by weight of a 2,2,3,3-tetrafluoropropylmethacrylate monomer, 1 part by weight of divinylbenzene as a crosslinking agent, and 0.2 parts by weight of benzoylperoxide were mixed and dissolved. The resultant solution, 3 parts by weight of polyvinyl alcohol, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 4 to 6 μm were obtained.

10 wt % of the resultant liquid crystal microcapsules were dispersed in a 10% aqueous isopropyl alcohol solution. The dispersion was applied on the surface of a glass substrate on which an aluminum reflecting electrode was previously formed, and was dried to form a liquid crystal microcapsule layer (light control layer). In addition, a polymer film on which a transparent electrode was previously formed was laminated on the liquid crystal microcapsule layer. In this way a liquid crystal display device of the present invention was manufactured.

The obtained liquid crystal display device was observed with a microscope. As a result, the structure of the liquid crystal microcapsule layer (light control layer) was analogous to that of Example 1 (FIGS. 4A and 4B). The thickness of the liquid crystal microcapsule layer (light control layer) was 11 μm. This liquid crystal display device was black and became colorless when applied with an AC voltage of 13 V at 50 Hz. The contrast ratio measured by a reflection densitometer was 3.5.

Comparative Example 3

80 parts by weight of a material prepared by dissolving 1 wt % of black dichroic dye S-435 in liquid crystal ZLI-1695 and 15 parts by weight of poly(2,2,3,3-tetrafluoropropylmethacrylate) were dissolved in chloroform. The resultant solution was applied on a glass substrate on which an aluminum reflecting electrode was previously formed, and was dried to form a liquid crystal layer (light control layer). Subsequently, a polymer film on which a transparent electrode was previously formed was laminated on the liquid crystal layer and adhered under pressure at 120° C. In this way a liquid crystal display device of a comparative example was manufactured.

The obtained liquid crystal display device was observed with a microscope. As a result, the structure of the liquid crystal layer (light control layer) was analogous to that of Comparative Example 1 (FIGS. 5A and 5B). The thickness of the liquid crystal layer (light control layer) was 11 μm. This liquid crystal display device was black and became colorless when applied with an AC voltage of 14 V at 50 Hz. The contrast ratio measured by a reflection densitometer was 2.7.

EXAMPLE 4

80 parts by weight of a material prepared by dissolving 1 wt % of black dichroic dye S-435 in liquid crystal ZLI-1695, 15 parts by weight of a 2,2,3,3-tetrafluoropropylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 Ian side and washed with pure water three times. In this manner liquid crystal microcapsules containing the liquid crystal composition in a transparent film and having an outer diameter of 4 to 6 μm were obtained. 10 wt % of the resultant liquid crystal microcapsules were dispersed in a 10% aqueous isopropyl alcohol solution. The dispersion was applied on the surface of a glass substrate on which an aluminum reflecting electrode was previously formed, and was dried to form a liquid crystal microcapsule layer (light control layer). In addition, a glass substrate on which a transparent electrode was previously formed was stacked on the liquid crystal microcapsule layer. The resultant structure was placed in a polyamide bag, the bag was evacuated, and in this state a heat treatment at 120° C. was performed to thermally adhere the glass substrates. In this way a liquid crystal display device of the present invention was manufactured.

The obtained liquid crystal display device was observed with a microscope. As a result, the structure of the liquid crystal microcapsule layer (light control layer) was similar to that of Example 2 (FIGS. 7A and 7B). That is, the liquid crystal microcapsules were stretched in the horizontal direction (a direction parallel to the substrate surface), and the fused portions were straight lines nearly parallel to the substrate surface (a polygonal structure). The thickness of the liquid crystal microcapsule layer (light control layer) was 8 μm. This liquid crystal display device was black and became colorless when applied with an AC voltage of 8 V at 50 Hz. The contrast ratio measured by a reflection densitometer was 4.5.

EXAMPLE 5

80 parts by weight of nematic liquid crystal ZLI-2659 (available from Merck Corp.) having negative dielectric anisotropy, 20 parts by weight of an octadecylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 4 to 6 μm were obtained.

10 wt % of the resultant liquid crystal microcapsules were dispersed in a 10% aqueous isopropyl alcohol solution. The dispersion was applied on the surface of a glass substrate on which a transparent electrode was previously formed, and was dried to form a liquid crystal microcapsule layer (light control layer). In addition, a glass substrate on which a transparent electrode was previously formed was stacked on the liquid crystal microcapsule layer. The resultant structure was placed in a polyamide bag, the bag was evacuated, and in this state a heat treatment at 100° C. was performed to thermally adhere the glass substrates. In this way a liquid crystal display device of the present invention was manufactured.

The obtained liquid crystal display device was observed with a microscope. Consequently, as in Example 4, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the liquid crystal microcapsule layer (light control layer) was 8 μm. The orientation of the liquid crystal molecules was almost perpendicular to the substrate surface. This liquid crystal display device was transparent and turned white when applied with an AC voltage of 9 V at 50 Hz. The contrast ratio calculated from the transmission absorbance was 25.

EXAMPLE 6

80 parts by weight of a material prepared by dissolving 1 wt % of black dichroic dye S-435 in nematic liquid crystal ZLI-2659 having negative dielectric anisotropy, 20 parts by weight of an octadecylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 4 to 6 μm were obtained.

10 wt % of the resultant liquid crystal microcapsules were dispersed in a 10% aqueous isopropyl alcohol solution. The dispersion was applied on the surface of a glass substrate on which a transparent electrode was previously formed, and was dried to form a liquid crystal microcapsule layer (light control layer). In addition, a glass substrate on which an aluminum reflecting electrode was previously formed was stacked on the liquid crystal microcapsule layer. The resultant structure was placed in a polyamide bag, the bag was evacuated, and in this state a heat treatment at 100° C. was performed to thermally adhere the glass substrates. In this way a liquid crystal display device of the present invention was manufactured.

The obtained liquid crystal display device was observed with a microscope. Consequently, as in Example 4, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the liquid crystal microcapsule layer (light control layer) was 9 μm. The orientation of the liquid crystal molecules was almost perpendicular to the substrate surface. This liquid crystal display device was colorless and turned black when applied with an AC voltage of 9 V at 50 Hz. The contrast ratio measured by a reflection densitometer was 5.0.

EXAMPLE 7

80 parts by weight of a material prepared by dissolving 1 wt % of black dichroic dye S-435 in liquid crystal ZLI-1695, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 4 to 6 μm were obtained.

10 wt % of the resultant liquid crystal microcapsules were dispersed in a 10% aqueous isopropyl alcohol solution. The dispersion was applied on the surface of a glass substrate on which an aluminum reflecting electrode was previously formed, and was dried to form a liquid crystal microcapsule layer (light control layer). Subsequently, a Teflon plate was pushed against the liquid crystal microcapsule layer at 120° C. and slightly moved in the horizontal direction. After the temperature was lowered to room temperature, the Teflon plate was removed and a polymer film on which a transparent electrode was previously formed was laminated. In this way a liquid crystal display device of the present invention was manufactured.

The obtained liquid crystal display device was observed with a microscope. Consequently, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the liquid crystal microcapsule layer (light control layer) was 8 μm. The orientation direction of the liquid crystal molecules was almost parallel to the substrate surface and equal to the direction in which the Teflon plate was moved. This liquid crystal display device was black and became colorless when applied with an AC voltage of 8.8 V at 50 Hz. The contrast ratio measured by a reflection densitometer was 4.6.

EXAMPLE 8

80 parts by weight of a material prepared by dissolving 1 wt % of black dichroic dye S-435 in liquid crystal ZLI-1695, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 μm side and washed with pure water three times. In this manner liquid crystal microcapsules containing the liquid crystal composition in a transparent film and having an outer diameter of 2 to 4 μm were obtained.

5 wt % of the resultant liquid crystal microcapsules were dispersed in a 10% aqueous isopropyl alcohol solution. The dispersion was applied on the surface of a glass substrate on which an aluminum reflecting electrode was previously formed, and was dried to form a first liquid crystal microcapsule layer. Subsequently, a Teflon plate was pushed against the first liquid crystal microcapsule layer at 120° C. and slightly moved in the horizontal direction. After the temperature was lowered to room temperature, the Teflon plate was removed.

In this state the first liquid crystal microcapsule layer was observed with a microscope. Consequently, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the first liquid crystal microcapsule layer was 4 µm. The orientation direction of the liquid crystal molecules was almost parallel to the substrate surface and equal to the direction in which the Teflon plate was moved.

Next, 80 parts by weight of the material prepared by dissolving 1 wt % of black dichroic dye S-435 in liquid crystal ZLI-1695, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 1 µm side and washed with pure water three times. In this manner liquid crystal microcapsules containing the liquid crystal composition in a transparent film and having an outer diameter of 2 to 4 µm were obtained.

5 wt % of the resultant liquid crystal microcapsules were dispersed in a 10% aqueous isopropyl alcohol solution. The dispersion was applied on the first liquid crystal microcapsule layer coated with the methylmethacrylate, and was dried to form a second liquid crystal microcapsule layer. Subsequently, a Teflon plate was pushed against the second liquid crystal microcapsule layer at 100° C. and slightly moved in a direction perpendicular to the first moving direction. After the temperature was lowered to room temperature, the Teflon plate was removed.

In this state the second liquid crystal microcapsule layer was observed with a microscope. Consequently, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the second liquid crystal microcapsule layer was 4 µm. The orientation direction of the liquid crystal molecules was almost parallel to the substrate surface and equal to the direction in which the Teflon plate was moved.

Finally, a polymer film on which a transparent electrode was previously formed was laminated on the second liquid crystal microcapsule layer. In this manner a liquid crystal display device of the present invention was manufactured. This liquid crystal display device was black and became colorless when applied with an AC voltage of 8.6 V at 50 Hz. The contrast ratio measured by a reflection densitometer was 5.3.

EXAMPLE 9

80 parts by weight of a material prepared by dissolving 1 wt % of black dichroic dye S-435 in liquid crystal ZLI-1695, 15 parts by weight of a fluorinated methacrylate monomer, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered to remove fine liquid crystal microcapsules by a filter with square meshes of 1 µm side and washed with pure water three times. In this manner liquid crystal microcapsules containing the liquid crystal composition in a transparent diameter of having an outer diameter of 4 to 6 µm were obtained. The resultant liquid crystal microcapsules and 8 parts by weight of an epoxy prepolymer (Epikote) were mixed, and the mixture was dropped into 200 parts by weight of a 5 wt % aqueous gelatin solution under stirring, thereby forming microdroplets. The aqueous gelatin solution was kept stirred at about 40° C. for one hour while a solution prepared by dissolving 3 parts by weight of an amine-based hardener in 50 parts by weight of water was gradually dropped into the aqueous gelatin solution.

Then, the resultant liquid crystal composition was filtered to remove fine liquid crystal microcapsules by a filter with square meshes of 1 µm side and washed with pure water three times. In this way liquid crystal microcapsules containing the liquid crystal composition in a transparent film with a two-layer structure of the fluorine-based methacrylate film and the epoxy resin film and having an outer diameter of 5 to 7 µm were obtained.

10 wt % of the resultant liquid crystal microcapsules were dispersed in a 10% aqueous isopropyl alcohol solution. The dispersion was applied on the surface of a glass substrate on which a transparent electrode was previously formed, and was dried to form a liquid crystal microcapsule layer (light control layer). Subsequently, a Teflon plate was pushed against the liquid crystal microcapsule layer and a heat treatment was performed at 120° C. for two hours, thereby thermally adhering the liquid crystal microcapsule layer to the glass substrate and hardening the epoxy resin. After the temperature was lowered to room temperature, the Teflon plate was removed and a polymer film on which a transparent electrode was previously formed was laminated. In this manner a liquid crystal display device of the present invention was manufactured.

The obtained liquid crystal display device was observed with a microscope. Consequently, the liquid crystal microcapsules fused to each other and had a polygonal structure in which the fused portions were straight. Also, the liquid crystal microcapsules were stretched in the horizontal direction (a direction parallel to the substrate surface). The thickness of the liquid crystal microcapsule layer (light control layer) was 8 µm. This liquid crystal display device was black and became colorless when applied with an AC voltage of 8.4 V at 50 Hz. The contrast ratio measured by a reflection densitometer was 4.3.

EXAMPLE 10

80 parts by weight of a material prepared by dissolving 1 wt % of black dichroic dye S-435 in liquid crystal ZLI-1695, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of polyvinyl alcohol, and 300 parts by weight of pure water were emulsified by a homogenizer. The resultant liquid crystal composition was polymerized at 85° C. for one hour. In this manner a dispersion of liquid crystal microcapsules containing the liquid crystal composition in a transparent film and having an outer diameter of 1 to 8 µm was obtained.

Subsequently, a glass substrate on which an aluminum reflecting electrode was previously formed was dipped into the liquid crystal microcapsule dispersion and slowly pulled up into the air at a pulling rate of 5 mm/min. The solution adhered to the substrate was sequentially dried when pulled up (exposed to the air). In a first liquid crystal microcapsule layer thus formed, the orientation of the liquid crystal molecules was nearly parallel to the substrate surface, and most liquid crystal molecules aligned themselves in a direction perpendicular to the pulling direction of the substrate.

Next, the substrate was again dipped into the liquid crystal microcapsule dispersion and slowly pulled up into the air at a pulling rate of 5 mm/min such that the pulling direction of the substrate was perpendicular to the first pulling direction. In this way a second liquid crystal microcapsule layer was stacked on the first liquid crystal microcapsule layer previously formed. In the second liquid crystal microcapsule layer, the orientation of the liquid crystal molecules was nearly parallel to the substrate surface and perpendicular to the orientation of most liquid crystal molecules in the first liquid crystal microcapsule layer.

In addition, a polymer film on which a transparent electrode was previously formed was laminated on the second liquid crystal microcapsule layer. In this manner a liquid crystal display device of the present invention in which the thickness of a liquid crystal microcapsule layer (light control layer) was 10 μm was manufactured. This liquid crystal display device was black and became colorless when applied with an AC voltage of 14 V at 50 Hz. The contrast ratio measured by a reflection densitometer was 5.5.

EXAMPLE 11

FIG. 8A is a schematic view showing one embodiment of a liquid crystal display device of the present invention. FIG. 8B is a sectional view of the liquid crystal display device shown in FIG. 8A. In FIG. 8B, reference numeral 11 denotes a glass substrate. A plurality of TFTs 12 are formed on the glass substrate 11. A reflecting plate 13 made of aluminum is arranged on the glass substrate 11 via an insulating film. This reflecting plate 13 forms a pixel electrode. In addition, a yellow liquid crystal layer 14a, a transparent electrode layer (pixel electrode) 15, a magenta liquid crystal layer 14b, a transparent electrode layer (pixel electrode) 15, and a cyan liquid crystal layer 14c are stacked in this order on the reflecting plate 13. Each of these liquid crystal layers 14a to 14c is formed by applying a dispersion containing microcapsules encapsulating a guest-host liquid crystal containing dye molecules of a corresponding color (yellow, magenta, or cyan), and volatilizing the dispersion medium. The transparent electrode layer 15 is formed by sputtering a transparent conductive material and patterning the material by using photolithography and etching. Note that the order of stacking of the liquid crystal layers 14a to 14c is not particularly limited.

Furthermore, a glass substrate having a transparent counter electrode 16 is arranged on the cyan liquid crystal layer 14c. Note that each TFT is electrically connected to the reflecting plate 13 or the transparent electrode layer 15.

In the liquid crystal display device with the above arrangement, neither active elements nor connecting lines as non-display regions are present in the liquid crystal layers 14a to 14c and the transparent electrode layers 15, so the aperture efficiency is high. Additionally, the light utilization is high because the transparent electrode layers are made of thin films without using any glass substrate.

Figure 9A:
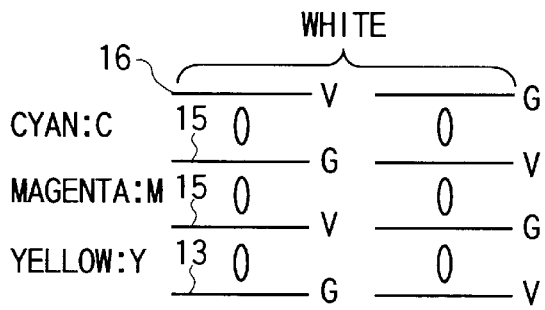
FIGS. 9A to 9H are views showing potential arrangements in Example 11 of the liquid crystal display device of the present invention.
Figure 9E:
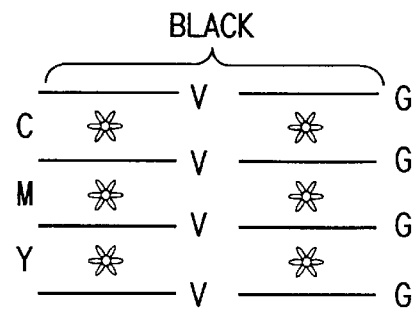
Figure 9B:
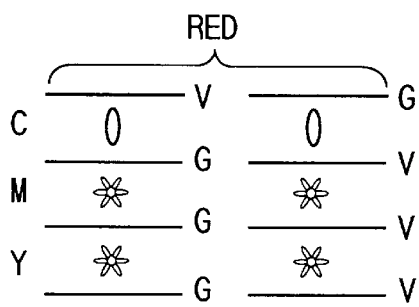
Figure 9F:
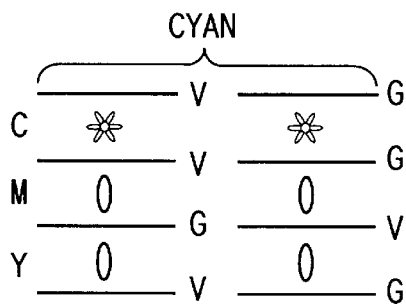
Figure 9C:
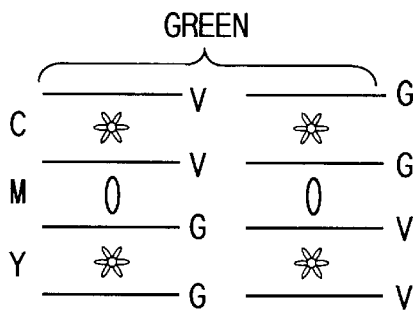
Figure 9G:
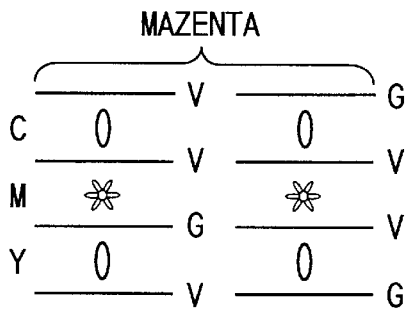
Figure 9D:
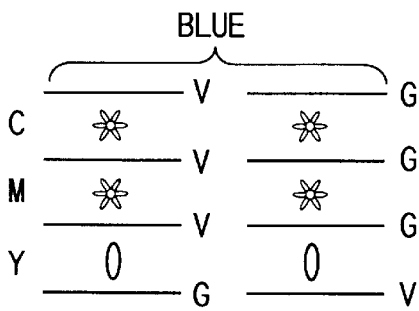
Figure 9H:
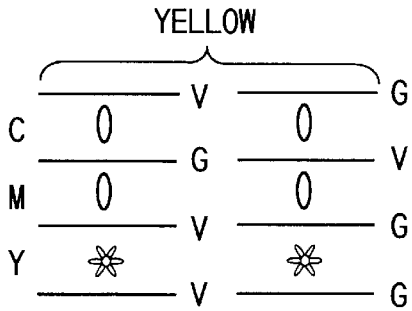

To perform a color display by using this liquid crystal display device, the voltages to be applied to the four electrodes sandwiching the liquid crystal layers are previously determined by an arithmetic circuit. To display "white", for example, the voltages are applied as shown in FIG. 9A. In FIG. 9A, G means GND or a certain reference potential, and V is a potential corresponding to GND, by which T can be saturated to a certain high state on the V-T characteristic described previously. Note that two types of voltage applications are shown because it is necessary to apply an AC waveform to the liquid crystal layers. To display "white" by using a guest-host liquid crystal, liquid crystal molecules and dye molecules must be raised as perpendicularly as possible with respect to the electrode surface in order to transmit light. Therefore, the voltages are applied as shown in FIG. 9A. Other colors could be displayed by controlling the voltages between the liquid crystal layers as shown in FIGS. 9B to 9H.

EXAMPLE 12

80 parts by weight of a liquid crystal material prepared by mixing 60 wt % of nematic liquid crystal E48 (available from Merck Corp.) having positive dielectric anisotropy and 40 wt % of cholesteric liquid crystal CB15 (available from Merck Corp.), 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 0.5 μm side and washed with pure water three times. In this manner liquid crystal microcapsules containing the liquid crystal composition in a transparent film and having an outer diameter of 2 to 5 μm were obtained. 10 wt % of the resultant liquid crystal microcapsules were dispersed in a 10% aqueous isopropyl alcohol solution. The dispersion was applied on the surface of a glass substrate on which a transparent electrode was previously formed, and was dried to form a liquid crystal microcapsule layer (light control layer). In addition, a polymer film on which a transparent electrode was previously formed was laminated on the liquid crystal microcapsule layer. Furthermore, a heat treatment at 120° C. was performed for the resultant structure to thermally adhere the glass substrate and the liquid crystal microcapsule layer. In this way a liquid crystal display device of the present invention was manufactured.

The obtained liquid crystal display device was observed with a microscope. As a result, the liquid crystal microcapsules fused to each other and had a polygonal structure in which the fused portions were straight. The thickness of the liquid crystal microcapsule layer (light control layer) was 5 μm. This liquid crystal display device had a green reflective color and became transparent when applied with a rectangular-wave AC voltage of 40 V at 50 Hz.

EXAMPLE 13

80 parts by weight of a liquid crystal material prepared by mixing 60 wt % of nematic liquid crystal E48 and 40 wt % of cholesteric liquid crystal CB15, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour.

Subsequently, the liquid crystal composition was filtered by a filter with square meshes of 0.5 μm side and washed with pure water three times. In this manner liquid crystal microcapsules containing the liquid crystal composition in a transparent film and having an outer diameter of 2 to 5 μm were obtained. 10 wt % of the resultant liquid crystal microcapsules were dispersed in a 10% aqueous isopropyl alcohol solution. The dispersion was applied on the surface of a glass substrate on which a transparent electrode was previously formed, and was dried to form a liquid crystal microcapsule layer (light control layer). In addition, a glass substrate on which a transparent electrode was previously formed was stacked on the liquid crystal microcapsule layer. The resultant structure was placed in a polyamide bag, the bag was evacuated, and in this state a heat treatment at 120° C. was performed to thermally adhere the glass substrates. In this way a liquid crystal display device of the present invention was manufactured.

The obtained liquid crystal display device was observed with a microscope. As a result, the liquid crystal microcapsules fused to each other and had a polygonal structure in which the fused portions were straight. Also, the liquid crystal microcapsules were stretched in the horizontal direction (a direction parallel to the substrate surface), and the fused portions were straight lines nearly parallel to the substrate surface. The thickness of the liquid crystal microcapsule layer (light control layer) was 5 μm. This liquid crystal display device had a green reflective color and became transparent when applied with a rectangular-wave AC voltage of 35 V at 50 Hz.

EXAMPLE 14

80 parts by weight of a liquid crystal material prepared by mixing 60 wt % of nematic liquid crystal E48 having positive dielectric anisotropy and 40 wt % of cholesteric liquid crystal CB15, 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour. Note that CB15 is a right-handed chiral dopant.

80 parts by weight of a liquid crystal material prepared by mixing 60 wt % of nematic liquid crystal E48 having positive dielectric anisotropy and 40 wt % of cholesteric liquid crystal C15 (available from Merck Corp.), 15 parts by weight of a methylmethacrylate monomer, 1 part by weight of divinylbenzene as a crosslinking agent, and 0.2 parts by weight of benzoylperoxide were mixed and dissolved. The resultant solution, 3 parts by weight of a surfactant, and 300 parts by weight of pure water were emulsified by a homogenizer. The resultant liquid crystal composition was polymerized at 85° C. for one hour. Note that C15 is a right-handed chiral dopant.

Subsequently, these liquid crystal compositions were filtered by a filter with square meshes of 0.5 μm side and washed with pure water three times. In this manner two types of liquid crystal microcapsules containing the liquid crystal composition in a transparent film and having an outer diameter of 1 to 3 μm were obtained.

10 wt % of each of these two types of liquid crystal microcapsules were dispersed in a 10% aqueous isopropyl alcohol solution. The liquid crystal microcapsules having a right-handed structure were applied on the surface of a glass substrate on which a transparent electrode was previously formed, and were dried to form a first liquid crystal microcapsule layer (light control layer). Subsequently, the liquid crystal microcapsules having a left-handed structure were applied on the surface of a glass substrate on which a transparent electrode was previously formed, and were dried to form a second liquid crystal microcapsule layer (light control layer). In addition, a polymer film on which a transparent electrode was previously formed was laminated on the second liquid crystal microcapsule layer. Thereafter, a heat treatment at 120° C. was performed for the resultant structure to thermally adhere the glass substrates and the liquid crystal microcapsule layers. In this way a liquid crystal display device of the present invention was manufactured.

The obtained liquid crystal display device was observed with a microscope. Consequently, the liquid crystal microcapsules in the first and second liquid crystal microcapsule a poly fused to each other and had a polygonal structure in which the fused portions were straight. The thickness of each of the first and second liquid crystal microcapsule layers (light control layers) was 2 μm. This liquid crystal display device had a green reflective color and became transparent when applied with a rectangular-wave AC voltage of 30 V at 50 Hz.

EXAMPLE 15

8 g of methylacrylate as a monomer, 2 g of vinylmethacrylate, and 0.1 g of dicumylperoxide as an initiator were mixed and dissolved in 40 g of a liquid crystal material prepared by dissolving a magenta dichroic dye, thereby preparing a liquid crystal composition. As a medium, 5 g of polyvinyl alcohol as an emulsifying agent were dissolved in 500 g of water.

Subsequently, the liquid crystal composition was extruded by a pressure of 0.4 kg/cm$^2$ into the medium via an emulsified film having a pore size of 1 μm. During the extrusion, the medium was circulated to give a flow to the surface of the emulsified film. The extruded liquid crystal oil droplets were washed off from the surface of the emulsified film to the medium. In this way uniform monomer-containing liquid crystal oil droplets having a grain size of 4 to 5 μm were obtained.

The emulsified solution consisting of the oil droplets thus obtained was polymerized in a nitrogen atmosphere at 75° C. for 12 hours to manufacture liquid crystal microcapsules. An aqueous solution containing the liquid crystal microcapsules was applied and dried on a glass substrate with a transparent electrode to form a 10-μm thick liquid crystal microcapsule layer. The surface of this liquid crystal microcapsule layer was observed by a microscope, and it was found that the liquid crystal microcapsules fused to have nearly equal sizes and form a structure close to a honeycomb structure.

Additionally, a glass substrate with a transparent electrode was stacked on the liquid crystal microcapsule layer to complete a liquid crystal display device. The driving voltage of this liquid crystal display device was measured and found to be 5 V. Also, when applied with a voltage the liquid crystal display device changed from magenta to transparent. Since the sizes of the liquid crystal microcapsules were nearly uniform in this liquid crystal display device, no steps were formed on the liquid crystal microcapsule layer and so scattering was little.

EXAMPLE 16

In the present invention, it is found that a desired pattern can be formed on a liquid crystal microcapsule layer by coating polymer walls of liquid crystal microcapsules with an exposure adhesion developing substance, evenly applying the liquid crystal microcapsules on a substrate to form a layer, performing pattern exposure for the liquid crystal microcapsule layer, and washing the surface of the substrate.

Figure 10:
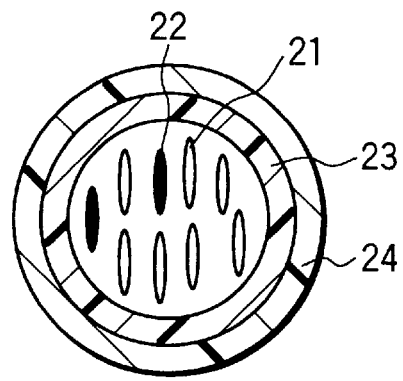
FIG. 10 is a schematic view showing a liquid crystal microcapsule in Example 16 of the liquid crystal display device of the present invention.

That is, a liquid crystal microcapsule of this embodiment is obtained by, for example, as shown in FIG. 10, forming an exposure adhesion developing substance layer 24 as the surface layer of a capsule in which a liquid crystal material containing liquid crystal molecules 21 and dichroic dye molecules 22 is contained in a polymer layer 23. Note that the whole polymer layer can also be made of the exposure adhesion developing substance.

Figure 11A:
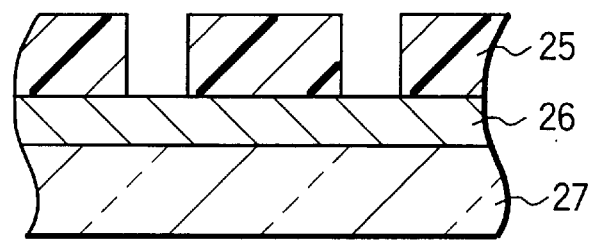
FIG. 11A is a sectional view showing a liquid crystal microcapsule layer in Example 16 of the liquid crystal display device.
Figure 11B:
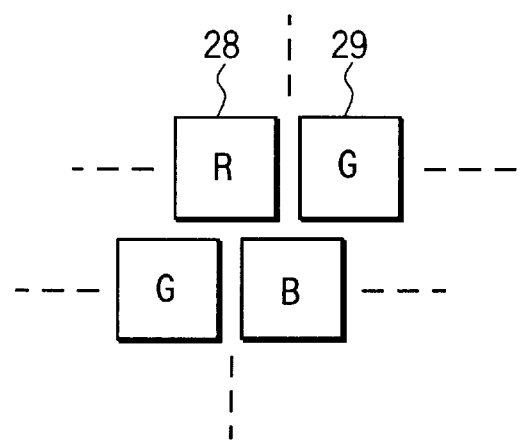
FIG. 11B is a plan view showing the arrangement of the liquid crystal microcapsule layer in Example 16 of the liquid crystal display device.

In this embodiment, as shown in FIG. 11A, these liquid crystal microcapsules are evenly applied on a glass substrate 27 having a transparent electrode 26 made from, e.g., ITO on its surface. The resultant substrate is pattern-exposed via a mask. Consequently, only in the exposed portion the exposure adhesion developing substance develops adhesion and the liquid crystal microcapsules adhere to the base (e.g., the substrate or the transparent electrode). Thereafter, the substrate is washed to wash away the liquid crystal microcapsules in the non-exposed portion, thereby forming a liquid crystal microcapsule layer 25 having a desired pattern. In this manner a liquid crystal microcapsule layer having a pattern of red, blue, and green as shown in FIG. 11B can be obtained. As a consequence, even when liquid crystal microcapsules are used it is possible to realize a liquid crystal display device which has a simple structure, can be manufactured at a low cost, and can provide a bright vivid display.

Examples of a yellow dichroic dye used in the liquid crystal microcapsule described above are G-232 (manufactured by Nippon Kanko Shikiso K.K.) and SI-209 and M-361 (manufactured by Mitsui Tohatsu Corp.) Examples of a cyan dichroic dye used in the liquid crystal microcapsule are SI-501, SI-497, and M-403 (manufactured by Mitsui Tohatsu Corp.), and G-472 (manufactured by Nippon Kanko Shikiso K.K.) Examples of a magenta dye used in the liquid crystal microcapsule are G-239, G-471, and G-202 (manufactured by Nippon Kanko Shikiso K.K.), and SI-512, M-618, and M-370 (manufactured by Mitsui Tohatsu Corp.)

The hue when the liquid crystal microcapsules are colored can be obtained by mixing the dichroic dyes described above. For example, red liquid crystal microcapsules can be prepared by mixing magenta and yellow dyes, blue liquid crystal microcapsules can be prepared by mixing magenta and cyan dyes, and green liquid crystal microcapsules can be prepared by mixing cyan and yellow dyes.

As the liquid crystal used in the liquid crystal microcapsule, it is possible to use, e.g., TC-4368XX, ZLI-4281/2, ZLI-3889, ZLI-5500-000, MLC-6041-000, ZLI-4620, ZLI-5100-000, ZLI-1840, ZLI-2116-000, and ZLI-2293 (manufactured by Merck Japan Corp.), and LIXON4033-0000XX, LIXON4034-000XX, and LIXON-5052 (manufactured by Chisso Kagaku Kogyo K.K.) However, the liquid crystal is not limited to these products.

Examples of the material of the transparent film (polymer wall) of the liquid crystal microcapsule are copolymers of divinylbenzene, methyl (meth)acrylate, ethyl (meth) acrylate, n-butyl (meth)acrylate, 2-hydroxyethyl (meth) acrylate, glycidyl (meth)acrylate, ethyleneglycol-di-(meth) acrylic ester, tribromophenyl (meth)acrylate, (meth) acrylonitrile, (meth)acrolein, (meth)acrylamide, methylenebis(meth)acrylamide, N-methylol-(meth) acrylamide, vinyl chloride, vinylidene chloride, butadiene, isoprene, (meth)acrylic acid, itaconic acid, and fumaric acid. However, the material is not limited to these copolymers.

An example of the exposure adhesion developing substance used in the liquid crystal microcapsule is 1,4-dihydropyridine. Specific examples are 2,6-dimethyl-4-(2'-nitrophenyl)-1,4-dihydropyridine-3,5-dicarboxylic dimethylester; 2,6-dimethyl-4-(2',-nitrophenyl)-1,4-dihydropyridine-3,5-dicarboxylic diethylester; 2,6-dimethyl-4-(2'-nitro-4', 5'-dimethoxyphenyl)-1,4-dihydropyridine-3,5-dicarboxylic diethylester; 2,6-dimethyl-4-(2'-nitrophenyl)-1,4-dihydropyridine-3,5-dicarboxylic diisopropylester; 2,6-dimethyl-4-(2'-nitrophenyl)-1,4-dihydropyridine-3,5-dicarboxylic di(β-ethoxyethyl)ester; 2,6-dimethyl-4-(2'-nitrophenyl)-1,4-dihydropyridine-3,5-dicarboxylic 3-methyl-5-ethylester; 2,6-dimethyl-4-(2'-nitrophenyl)-1,4-dihydropyridine-3,5-dicarboxylic 3-isopropyl-5-methylester; 2,6-dimethyl-4-(2'-nitrophenyl)-3-aceto-1,4-dihydropyridine-5-carboxylic ethylester; 2,6-dimethyl-4-(2"-nitrophenyl)-3,5-diaceto-1,4-dihydropyridine; and 2,6-dimethyl-4-(2'-nitrophenyl)-3,5-dicyano-1,4-dihydropyridine. However, the substance is not restricted to these compounds.

More specifically, a liquid crystal display device containing the above liquid crystal microcapsules can be manufactured as follows.

A polyacrylic ester layer containing 1 wt % of 2,6-dimethyl-4-(2"-nitrophenyl)-1,4-dihydropyridine-3,5-dicarboxylic dimethylester was formed on the surfaces of blue liquid crystal microcapsules (the liquid crystal material: TC-4368XX manufactured by Merck Japan Corp., the dye materials: SI-497 manufactured by Mitsui Tohatsu Corp. +G-239 manufactured by Nippon Kanko Shikiso K.K., and the polymer material of the wall: divinylbenzene) prepared by emulsion polymerization as in Example 15 and having an average grain size of about 10 μm.

These liquid crystal microcapsules were applied on a glass substrate having an ITO layer as a transparent electrode on its surface. Ultraviolet rays having a wavelength of 365 nm were irradiated with an energy of 200 mJ/cm$^2$ by using an exposing machine incorporating a super-high pressure mercury lamp as a light source.

Consequently, only the liquid crystal microcapsules in the exposed portion adhered to the substrate. The substrate was then dipped into water and ultrasonically cleaned, thereby obtaining a pattern in which the liquid crystal microcapsule layer remained only in the exposed portion.

Subsequently, the same manufacturing steps as above were performed for red and green liquid crystal microcapsules, forming a liquid crystal microcapsule layer having a delta pattern of red, green, and blue as shown in FIG. 11B.

Additionally, a glass substrate with a transparent electrode was stacked on the liquid crystal micro-capsule layer to complete a liquid crystal display device. The driving voltage of this liquid crystal display device was measured and found to be 15 V.

Also, the liquid crystal display device was has a simple structure. In the liquid crystal display device, a white color becomes bright, and a color becomes clear. (Example 17) A liquid crystal microcapsule layer having a delta pattern of red, green, and blue as shown in FIG. 11B was formed following the same procedure as in Example 16 except that 2,6-dimethyl-4-(2'-nitrophenyl)-1,4-dihydropyridine-3,5-dicarboxylic dimethylester was irectly adhered to the surfaces of blue liquid crystal icrocapsules (the liquid crystal material: TC-4368XX manufactured by Merck Japan Corp., the dye materials: SI-497 manufactured by Mitsui Tohatsu Corp. +G-239 manufactured by Nippon Kanko Shikiso K.K., and the polymer material of the wall: divinylbenzene) prepared by emulsion polymerization and having an average grain size of about 10 gm, and that the ultraviolet irradiation energy was set to 50 mJ/cm$^2$.

Additionally, a glass substrate with a transparent electrode was stacked on the liquid crystal micro-capsule layer to complete a liquid crystal display device. The driving voltage of this liquid crystal display device was measured and found to be 15 V.

Also, in the manufacture of this liquid crystal display device, the exposure energy could be reduced compared to that in Example 16.

As has been described above, the liquid crystal display device of the present invention comprises a pair of substrates each having an electrode on a surface and so arranged that the electrodes oppose each other, and a light control layer sandwiched between the substrates. In this display, the light control layer contains microcapsules containing a liquid crystal material in a transparent film, and adjacent microcapsules adhere close to each other, or the microcapsules have a polygonal structure. Accordingly, the display has a high light transmittance in a bright portion, can effectively use incident light, and can perform a high-contrast display.

Also, in a method of manufacturing a liquid crystal display device according to the present invention, a light control layer consisting of micro-capsules containing a liquid crystal material in a transparent film is formed on at least one of a pair of substrates each having an electrode on a surface, the microcapsules are fused to each other, and the substrates are so arranged that the electrodes oppose each other, thereby sandwiching the light control layer 3between the substrates. Accordingly, the liquid crystal display device can be efficiently manufactured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device comprising:
    a substrate having an electrode on a surface; and
    a light control layer formed on said substrate, wherein said light control layer contains microcapsules containing a liquid crystal material in a transparent film, and said microcapsules have a polygonal structure in which upper and bottom layers thereof are parallel to a surface of the substrate.

2. A display according to claim 1, wherein liquid crystal molecules of said liquid crystal material are arranged substantially parallel to the substrate surface.

3. A display according to claim 1 wherein liquid crystal molecules of said liquid crystal material are arranged substantially parallel to the substrate surface, a plurality of layers of said microcapsules are stacked, and many liquid crystal molecules in the same layer are arranged in the same direction.

4. A display according to claim 1, wherein liquid crystal molecules of said liquid crystal material are arranged substantially perpendicularly to the substrate surface.

5. A display according to claim 1, wherein said liquid crystal material contains a dichroic dye.

6. A display according to claim 1, wherein said liquid crystal molecules in each microcapsule are oriented randomly with respect to liquid crvstal molecules in different 7. A display according to claim 1, wherein said transparent film forming said microcapsule is made from at least two types of materials. microcapsules.

* * * * *